З,052,594
SLIMICIDES
Marion A. Baker, Ardsley, N.Y., assignor to Shell Oil Company, New York, N.Y., a corporation of Delaware
No Drawing. Filed Mar. 30, 1960, Ser. No. 18,482
9 Claims. (Cl. 162—161)

The present invention relates to the employment of acetals of acrolein as slimicides—that is, to inhibit and destroy slime—in industrial water systems, particularly water employed in cooling towers, water tanks, sewage disposal units, settling ponds in wineries, and recirculating aqueous process streams such as are used in paper manufacture.

Slime of the type encountered in industrial water systems is an accumulation of bacteria and algae together with some fungi which together present a physical appearance similar to gelatin. Slime exists in the form of slime-forming organisms which reproduce in free suspension in the water system, as agglomerating masses of such organisms in the water system, and finally as jelly-like masses which may take the form of stringy or ropy streamers which attach to the containing walls. Slime often acquires color from the slime-producing organisms or from the interaction between the microorganisms and the chemicals in the water. Slime-forming microorganisms are contained in virtually all industrial waters. Of the multitude of industrial processes where slime causes serious disadvantages, the papermaking process is faced with the slime problem in its most acute form. For this reason, the employment of the compounds of the present invention will be discussed with particular attention to pulp and paper manufacture. It should be understood, however, that the use of the disclosed compounds as slimicides is not restricted to the paper-making industry but rather encompasses the use of these compounds in industrial waters broadly with particular emphasis upon recirculating industrial waters.

Paper slime constitutes one of the most serious problems of the papermaking industry because it causes spots, pinholes and breaks in the paper and often influences poor formation of the sheet. Slime also collects about screens, wires and other equipment, thus making necessary frequent cleaning-up periods with resulting loss of production. With the increased use of white water, that is, water which has previously been used in the papermaking manufacturing process, the importance of an economical yet efficient slimicide in papermaking has become increasingly manifest. An economical yet efficient chemical slimicide is also necessary in cooling towers, water tanks, sewage disposal units, wine settling ponds and particularly in continuaually recirculating industrial waters where slime formation prevents efficient reuse of the water.

The chemical needed in all of these operations must be rapidly effective against a broad spectrum of organisms comprising essentially fungi and algae together with some bacteria. It has long been known that a chemical which is effective against only one or two of these types of organisms will not be an effective slimicide. The compounds of the present invention are promising slimicides because they are rapidly effective against all three types of organisms, particularly the more important bacteria and algae, without adversely affecting the utility of the treated water. Because of this broad spectrum of toxicity against slime-forming organisms, the compounds of the present invention are considered outstanding slimicides potentially of commercial importance.

The employment of these chemicals as slimicides will be described with particular reference to their employment in paper manufacture, it being understood that other enumerated industrial applications also constitute important uses of these compounds. Pulp is a commercial cellulosic materials prepared from wood, rags and other sources which is used in the manufacture of paper. Pulp may be prepared from wood by either mechanical or chemical processes both of which are utilizable for the purposes of the present invention. In the mechanical process the wood is shredded to form a ground wood or pulp. In the chemical process, on the other hand, the cellulose and the wood are freed from the lignin content and other non-cellulosic substances present therein by treatment with reagents which form soluble reaction products with the non-cellulosic materials. The residual cellulose so treated is subsequently washed and bleached. The chief methods of chemical pulping are the sulfite process and the sulfate or kraft process. In essence the sulfite process comprises heating the wood under pressure with a solution of calcium bisulfite containing excess sulfur dioxide. In the sulfate process an alkaline solution containing sodium sulfide is employed. The present invention also contemplates the employment of pulp prepared by a semi-chemical process such as, for example, chemically softening the wood to permit mechanical separation of the fiber.

The pulps employed for the purposes of the present invention may vary considerably without departing from the scope of the invention. Thus, the pulp employed may, if desired, be additionally treated by bleaching. Pulps which may be employed for the purposes of the present invention include unbleached ground wood, unbleached sulfite, bleached sulfite, semi-bleached sulfate and bleached sulfate or bleached kraft. All of these raw materials are satisfactory, it being understood, however, that the present invention is not restricted to the enumerated pulps.

In the papermaking process, the pulps are prepared as water slurries. In this form they are conveyed, measured and subjected to the desired mechanical treatments before being processed through the paper machine. Such mechanical treatment of the fibers has been found necessary for those grades of paper most commonly used because it expedites the establishment of the system's behavior during the actual sheet-forming and drying procedures. This treatment of the pulp, which precedes the passing of the raw material into the papermaking machine itself, includes slushing, beating, refining, filling, loading, sizing and coloring, all in accordance with methods well known to those well versed in the art. Slushing generally denotes that the dry sheets of pulp are fiberized or otherwise disintegrated in water to form a slush of separated fibers. This operation is conducted merely to disperse the fibers in water. Beating and refining refer to the operations carried out and the effects produced by conventionally employed beating and refining equipment such as the Hollander beater. Beating increases fiber surface and flexibility and tends to decrease fiber length. The cellulosic and hemicellulosic constituents of the fiber tend to swell upon beating and the amount of water bound in the fiber increases with an associated decrease in pulp freeness.

Many types of paper contain fillers such as clay, chalk or other metallic oxides or salts which are added to slurries during stock preparations to effect specific properties. Rosin, various hydrocarbons and natural hydrocarbons and natural waxes, glues, synthetic resins, rubber latex, and the like are among the materials employed as sizing agents. Paper is generally sized to cause resistance to penetration by liquids, particularly water. The sizing agents are quite often added to the stock before it is passed to the papermaking machine. It is, of course, also possible to pass the sheets through a size solution or over a roll wetted with the size solution. When desired, coloring matter may also be added to the pulp in accordance with any of the methods known to the art such as dip dyeing or calender staining of board.

The conversion of the fibrous suspension of pulp prepared by the above method into paper sheet involves three major steps: (1) the random arrangement of the fibers of the suspension into a wet web; (2) the removal of a portion of the free water from the wet web by weighting or pressing; and (3) progressive removal of water by heating. Broadly considered, a wet sheet is generally formed by running a dilute suspension of fibers evenly over the surface of a moving endless belt of wire cloth through which the excess water may be drained or by running an endless belt of wire cloth through a suspension of fibers. In the first case, commonly called the Fourdrinier process, a portion of the water drains off by gravity, a second portion is taken from the sheet by suction, and the remainder is removed by pressure. In the latter method a vacuum is maintained below the cylinder in which the wire cloth is rotating and the sheet forms on the wire by suction. It has been estimated that the stock progressing on the wire contains 99–99.5% or more water, and the wet sheet coming off at the couch roll may contain 78–82% water. Many factors, of course, affect the rate of draining, including, for example, wire size, stock temperature, the presence of deflocculating chemicals and fiber condition in terms of hydration, fiber tension and fibrillation. The water leaving the wire of the Fourdrinier machine or cylinder of a cylinder machine is known as white water. White water contains a measurable amount of fibers lost mainly through the wire mesh where the sheet is first formed, together with water solubles, such as starch, rosin, alum, dyestuffs, etc. The composition of white water will, of course, vary with each mill operation. White water is reused until the soluble constituents increase to the point where its continued employment is either uneconomical or undesirable.

One most important problem involved in the reuse of white water is the presence of slime-forming organisms. It has now been found that the addition of an acrolein dialiphatic acetal, such as acrolein diethyl acetal, acrolein dimethyl acetal and acrolein diallyl acetal, to the water which is to be used in the paper manufacturing process or to the white water which has already been used in the paper manufacturing process actively and effectively destroys noxious slime-forming organisms. This discovery is particularly important because of the increasing employment of closed systems employing white water. Through the employment of acrolein acetals, such as acrolein diethyl acetal, maximum utility of this industrial water is effected at considerable saving of time and money.

The acrolein dialiphatic acetals particularly contemplated by the present invention for use in industrial waters broadly and more particularly recirculating industrial waters such as those in pulp and paper manufacture may be represented by the following general formula:

$$CH_2=CHCH(OR)_2$$

wherein R is an aliphatic group, either straight or branched chain, ranging from one to not more than ten carbon atoms. Preferably the group R contains from one to five carbon atoms, and the dialkyl acetals are most desirable. A preferred acetal of the present invention is acrolein diethyl acetal. Other desirable species are acrolein dimethyl acetal, acrolein propargyl acetal and acrolein diallyl acetal.

Specific other examples of suitable acrolein diacetals are acrolein dipropyl acetal, acrolein diisopropyl acetal, acrolein di(2-butenyl)acetal, the acrolein dibutyl acetals, acrolein di(3-heptenyl)acetal, acrolein diheptyl acetal and acrolein didecyl acetal.

In accordance with the invention, an acrolein dialiphatic acetal is added to the water or aqueous medium, such as an aqueous process stream to be protected from slimes in an amount sufficient to effect destruction of the slime-forming organisms. A concentration of the acetal of as little as one part per million parts by weight of the water or aqueous stream in some cases is effective. In other cases an acetal concentration of 50 parts per million (same basis) or even more may be required to effectively destroy heavy populations of slime-forming organisms. In the majority of cases, an acetal concentration of from about 5 parts per million to about 20 parts per million (same basis) will be preferred. The acetal may be added continuously to the water or, if desired, batchwise.

In paper manufacture is it possible to add the acetal to the water before the papermaking operation is initiated, during the papermaking process or, if desired, to spent white water which is considered unusable because of its slime content after the papermaking process. The acetals of the present invention are particularly advantageous for use in paper manufacture because they do not leave residue on the paper sheets, whereas chemicals which have heretofore been used in the papermaking process as slimicides often leave an undesirable residue. The marked effectiveness of the compounds of the present invention, as slimicides, is amply illustrated by an experiment wherein white water obtained from an operating paper mill was placed in screw cap vials containing varying amounts of acrolein diethyl acetal. Following an incubation period of 48 hours at 37° C., a loopful of material was removed from each tube and streaked in Emerson's agar. The streaked plates were then incubated at 37° C., for 48 hours and observed for absence or presence of slime growth. The addition of acrolein diethyl acetal in concentration of 10 parts per million of medium destroyed all white water slime.

Since slime contains a large quantity of aerobic bacteria of the Aerobacter and Bacillus genera and a broad spectrum of fungi as well as algae, in-vitro tests were conducted which show the high activity of acrolein acetals against these microorganisms. These tests show acrolein acetals are highly effective against both bacteria and fungi representative of those which may be found in industrial water. Results of these tests are summarized in the following table:

| Type of Organism | Name of Organism | Concentration in p.p.m. for Control of Organism | |
|---|---|---|---|
| | | Acrolein Diethyl Acetal | Acrolein Dimethyl Acetal |
| Bacterium | Bacillus subtilis | 10 | 10 |
| Do | Aerobacter aerogenes | 15 | 10 |
| Do | Pseudomonas aeruginosa | 40 | 20 |
| Do | Achromobacter citreus | 20 | 15 |
| Do | Leuconostoc mesenteroides | 20 | 15 |
| Do | Mycobacterium avium | 20 | 10 |
| Do | Desulfovibrio desulfuricans | 10 | |
| Fungus | Chaetomium globosum | 40 | 20 |
| Do | Sclerotium rolfsii | 10 | 5 |
| Do | Verticillium albo-atrum | 40 | 20 |
| Do | Penicillium italicum | 40 | 20 |

The broad spectrum of toxicity toward slime-forming bacteria, fungi and algae exhibited by the acrolein dialiphatic acetals is further evidenced by another experiment wherein acrolein diethyl acetal and acrolein diallyl acetal were tested against the algae Chlorella, a known slime producer. In all tests conducted control was brought about employing about 10 p.p.m. of toxicant. Hence, it is clear that compounds of the present invention, particularly acrolein diethyl acetal, manifest toxicity against all three types of slime-producing organisms found in industrial water. Not only are these compounds effective against slime-forming organisms themselves but also they are uniquely effective against the highly resistant agglomerating masses and ropy streamers produced by these organisms in the water. It is because of this effectiveness in combating agglomerating slime masses that the defined compounds of the present invention are of such great value. In contradistinction to the compounds of the present invention, compounds which are merely effective against bacteria or fungi or algae alone are not necessarily useful as slimicides. Such compounds commonly fail when employed to combat slime masses caused by a class of organisms to which the compound is effective against only one class of organisms such as bacteria, the employment of the chemical may remove the bacteria and favor the development of either fungi or algae. The active compounds of the present invention can be employed with any type of anti-microbial slime problem, and will not favor the development of another type of micro-organism.

The active compounds of the present invention may be used alone or in the form of a solution, preferably a water solution, suitable emulsion or suspension and, if desired, in combination with other slimicide agents. Mixtures of the compounds of the present invention with other slimicides are also within the scope of the present invention. It is also possible to employ the compounds of the present invention with chemicals which act to alter or modify the tensile strength, particularly the wet strength, absorbency, color, texture, grease resistance, gloss and printability of the final product. Other combinations of chemicals with slimicides of the present invention will be apparent to those well versed in the art, it being understood that the enumerated combinations of the present slimicides with chemicals employed in pulp and paper manufacture are not restricted to the specified functions of these chemicals or other specific chemicals indicated.

It will be understood that though particular emphasis has been placed on the employment of the compounds of the present invention in combating slime in pulp and paper industrial water the aforementioned compounds may be employed with good results in combating slime in other industrial waters.

I claim as my invention:

1. A method of combating slime caused by bacteria, fungi and algae in an aqueous medium comprising the step of adding a slimicidally effective amount of an acrolein dialiphatic acetal to said water to provide a slimicidally effective concentration of said acetal in said aqueous medium.

2. A method of combating slime caused by bacteria, fungi and algae in industrial aqueous streams comprising the step of adding a slimicidally effective amount of acrolein diethyl acetal to said water to provide a slimicidally effective concentration of said acetal in said aqueous stream.

3. In the preparation of paper from pulp comprising essentially the steps of preparing a fiber suspension of pulp, arranging fibers in said suspension into a wet web and removing the free water from said web, the improvement comprising adding a slimicidally effective amount of an acrolein dialiphatic acetal to water employed in said preparation, to provide a slimicidally effective concentration of said acetal in said water.

4. In the preparation of paper from pulp comprising essentially the steps of preparing a fiber suspension of pulp, arranging fibers in said suspension into a wet web and removing the free water from said web, the improvement comprising adding to water employed in said preparation a slimicidally effective amount of a compound having the formula $$CH_2=CHCH(OR)_2$$

wherein R is an aliphatic group of from 1–10 carbon atoms to provide a slimicidally effective concentration of said compound in said water.

5. In the preparation of paper from pulp comprising essentially the steps of preparing a fiber suspension of pulp, arranging fibers in said suspension into a wet web and removing the free water from said wet web, the improvement comprising adding a slimicidally effective amount of an acrolein dialiphatic acetal to said water, to provide a slimicidally effective concentration of said acetal in said water.

6. In the preparation of paper from pulp comprising essentially the steps of preparing a fiber suspension of pulp, arranging fibers in said suspension into a wet web and removing the free water from said wet web, the improvement comprising adding a slimicidally effective amount of acrolein diethyl acetal to said water, to provide a slimicidally effective concentration of said acetal in said water.

7. In the preparation of paper from wood pulp comprising essentially the steps of treating wood with a reagent which forms soluble compounds with non-cellulosic compounds contained therein, washing and bleaching the residual cellulose to form pulp, forming a fiber suspension of said pulp, arranging fibers in said suspension into a wet web, and removing the free water from said wet web, the improvement comprising adding a slimicidally effective amount of acrolein dialiphatic acetal to said water, to provide a slimicidally effective concentration of said acetal in said water.

8. In the preparation of paper from wood pulp comprising essentially the steps of treating wood with a reagent which forms soluble compounds with non-cellulosic compounds contained therein, washing and bleaching the residual cellulose to form pulp, forming a fiber suspension of said pulp, arranging fibers in said suspension into a wet web, and removing the free water from said wet web, the improvement comprising adding a slimicidally effective amount of acrolein diethyl acetal to said water, to provide a slimicidally effective concentration of said acetal in said water.

9. In the preparation of paper from wood pulp comprising essentially the steps of treating wood with a reagent which forms soluble compounds with non-cellulosic compounds contained therein, washing and bleaching the residual cellulose to form pulp, forming a fiber suspension of said pulp, arranging fibers in said suspension into a wet web, and removing the free water from said wet web, the improvement comprising adding a slimicidally effective amount of acrolein diethyl acetal continuously at a concentration of 1 part per million to 50 parts per million to said water.

References Cited in the file of this patent

UNITED STATES PATENTS

| | | |
|---|---|---|
| 2,562,870 | Owen | July 31, 1951 |
| 2,626,283 | Whetstone | Jan. 20, 1953 |
| 2,785,995 | Kress | Mar. 19, 1957 |